United States Patent
Ramsey

(10) Patent No.: US 12,013,277 B2
(45) Date of Patent: Jun. 18, 2024

(54) SYSTEMS AND METHODS FOR STORING FLUID AND MEASURING VOLUME

(71) Applicant: RAPA Technologies, LLC, Meriden, NH (US)

(72) Inventor: Marc C. Ramsey, Meriden, NH (US)

(73) Assignee: RAPA Technologies, LLC, Meriden, NH (US)

( * ) Notice: Subject to any disclaimer, the term of this patent is extended or adjusted under 35 U.S.C. 154(b) by 84 days.

(21) Appl. No.: 18/155,262

(22) Filed: Jan. 17, 2023

(65) Prior Publication Data

US 2023/0228610 A1    Jul. 20, 2023

Related U.S. Application Data

(60) Provisional application No. 63/300,131, filed on Jan. 17, 2022.

(51) Int. Cl.
*G01F 22/00*         (2006.01)
*G01F 23/24*         (2006.01)

(52) U.S. Cl.
CPC .......... *G01F 23/241* (2013.01); *G01F 23/248* (2013.01)

(58) Field of Classification Search
CPC ...... F17B 1/26; F17B 1/00; F17B 1/12; G01F 23/241; G01F 23/248; G01F 25/0084; G01F 22/00; F17C 2203/0621; F17C 2203/0624; F17C 2203/0626; F17C 2203/0631; F17C 2201/056; F17C 2201/058; F17C 2203/012; F17C 2203/013; F17C 2203/0617; F17C 2203/0636; F17C 2203/0658; F17C 2221/011; F17C 2223/0123; F17C 2223/035; F17C 2260/011

See application file for complete search history.

(56) References Cited

U.S. PATENT DOCUMENTS

| | | | | |
|---|---|---|---|---|
| H80 | H | * | 7/1986 | Lewis .................. F17C 9/00 222/386.5 |
| 6,990,860 | B1 | | 1/2006 | Gillanders |
| 7,337,922 | B2 | * | 3/2008 | Rake ................. A61M 5/148 604/890.1 |
| 7,600,423 | B1 | | 10/2009 | Fluhler et al. |
| 10,161,779 | B2 | | 12/2018 | Lazzi et al. |
| 2008/0209918 | A1 | * | 9/2008 | White ................. F17C 13/026 62/50.1 |
| 2013/0306538 | A1 | * | 11/2013 | Morris .................. F17C 1/005 210/209 |

(Continued)

FOREIGN PATENT DOCUMENTS

| | | | |
|---|---|---|---|
| DE | 102019202894 A1 | * | 9/2020 |
| WO | 2017182784 A1 | | 10/2017 |

OTHER PUBLICATIONS

DE-102019202894-A1 (Year: 2020).*

*Primary Examiner* — Kristina M Deherrera
*Assistant Examiner* — Fatemeh Esfandiari Nia
(74) *Attorney, Agent, or Firm* — Scale LLP

(57) ABSTRACT

Systems and methods for storing fluid are described. In some embodiments, a system may include a container having an internal volume that is configured to change as fluid enters or exits, a first shell component, and a second shell component. The first shell component may limit an expansion of the container in a first direction, and the second shell component may limit the expansion of the container in a second direction that is opposite the first direction.

20 Claims, 9 Drawing Sheets

(56) References Cited

U.S. PATENT DOCUMENTS

2014/0374416 A1* 12/2014 Tom ..................... B29C 49/783
                                                    220/62.21
2022/0373249 A1* 11/2022 Wisniewski ............ F25D 15/00

* cited by examiner

SYSTEMS AND METHODS FOR STORING FLUID AND MEASURING VOLUME

CROSS-REFERENCE TO RELATED APPLICATIONS

This application claims priority to U.S. Provisional Application No. 63/300,131, filed Jan. 17, 2022, which is incorporated herein by reference in its entirety.

This invention was made with government support under Contract No. 80NSSC21C0078 awarded by the National Aeronautics and Space Administration. The government has certain rights in the invention.

FIELD OF THE DISCLOSURE

This disclosure relates to systems and methods for storing fluid and measuring volume. More particularly, this disclosure relates to tools that can be used to efficiently store and measure fluid for spaceflight applications such as vehicles, stations, and suits.

BACKGROUND

Human spaceflight applications including vehicles, stations and suits must store and manage a variety of liquids, such as water. In traditional applications, rigid containers are used to store liquid. Rigid containers are poorly adapted for spaceflight applications because, among other reasons, the liquid may not remain in contact with the container in a low-gravity environment. In addition, it is advantageous to store liquid in pressure that is in equilibrium with the ambient environment within the spacecraft. Rigid containers may require a vent to achieve equilibrium. Such vents often provide further issues such as potential leaks. Finally, it is often desirable to minimize the exposure of a fluid to gas, thus limiting undesirable chemical reactions and avoiding the introduction of bubbles. A partially-full rigid container presents ullage that is typically filled with gas.

Bladders may also be used for fluid storage. Bladders are typically welded together from flat sheet either in a simple "lay-flat" configuration or pieced together into a three-dimensional "nominal-full" geometry. Such assemblies necessarily form wrinkles either when full or when empty. These wrinkles lead to mechanical stress concentrations and fatigue in the membrane material, limiting both the internal pressure resistance and the fill-drain cycle life of the bladder.

Bladder membranes may also be composed of plastics or elastomers that can leach impurities such as plasticizers into the fluid and/or can be chemically degraded by biocides, cleaning solvents, chemical reagents, or ultra-violet radiation. To date, bladders have not been made from ultra-pure, chemically stable materials because those materials generally do not have adequate mechanical properties to serve well in these designs. Further, bladders with a reasonable level of internal pressure tolerance generally must be nominally spherical or cylindrical in shape. This leads to inefficient use of volume in the flat-rectangular spaces that are typically available within a vehicle structure. Flexible bladders can also be difficult to mount within a rigid structure, and their location can be uncertain under variable acceleration.

In many situations, a volume of fluid stored in a container needs to be monitored. For terrestrial fluid storage, the volume of stored fluid may be monitored by measuring weight or the level of fluid in the container. Weighing is not an option is applications such as space exploration which may involve zero or variable apparent gravity. In addition, in situations in which either the apparent gravity vector or the container shape is variable, a level measurement cannot be used to measure remaining volume.

Accordingly, there is a need for systems and methods that allow for fluid to be securely stored in a spatially efficient manner, with minimal risk for failure or contamination. Further, there is a need for systems and methods that allow a volume of fluid in a container to be accurately measured in low-gravity environments.

SUMMARY

The following description presents a simplified summary in order to provide a basic understanding of some aspects described herein. This summary is not an extensive overview of the claimed subject matter. It is intended to neither identify key or critical elements of the claimed subject matter nor delineate the scope thereof.

In some embodiments, there may be a system for storing fluid. The system may include a container. The container may have an internal volume that is configured to change as fluid enters or exits the container. The system may also have a first shell component and a second shell component. The internal volume of the container may be disposed between the first shell component and the second shell component such that the first shell component may limit an expansion of the container in a first direction, and the second shell component may limit the expansion of the container in a second direction that is opposite the first direction. The system may also include a space that may be defined between the second shell component and a first surface portion of the container. The space may have a volume that decreases as fluid enters the container and the internal volume of the container increases.

In some embodiments, there may be a system for sensing volume. The system may include a container. The container may have an internal volume that may be configured to change as fluid enters or exits the container. The system may also include a first loop. The first loop may be disposed on a first side of the container. The system may also include a second loop. The second loop may be disposed along a second side of the container. The second loop may move relative to the first loop as the internal volume of the container changes. A first current traveling through one of the first loop and the second loop may induce a second current in the other of the first loop and the second loop. A magnitude of the second currently may vary based on changes in the internal volume of the container. The first loop may be disposed about the first side of the container such that at least 20% of an area of the first side of the container is disposed within the first loop. A magnitude of the second current may indicate an average thickness of the fluid between the first side of the container and the second side of the container.

Further variations encompassed within the systems and methods are described in the detailed description of the invention below.

DETAILED DESCRIPTION

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Figure 1A:
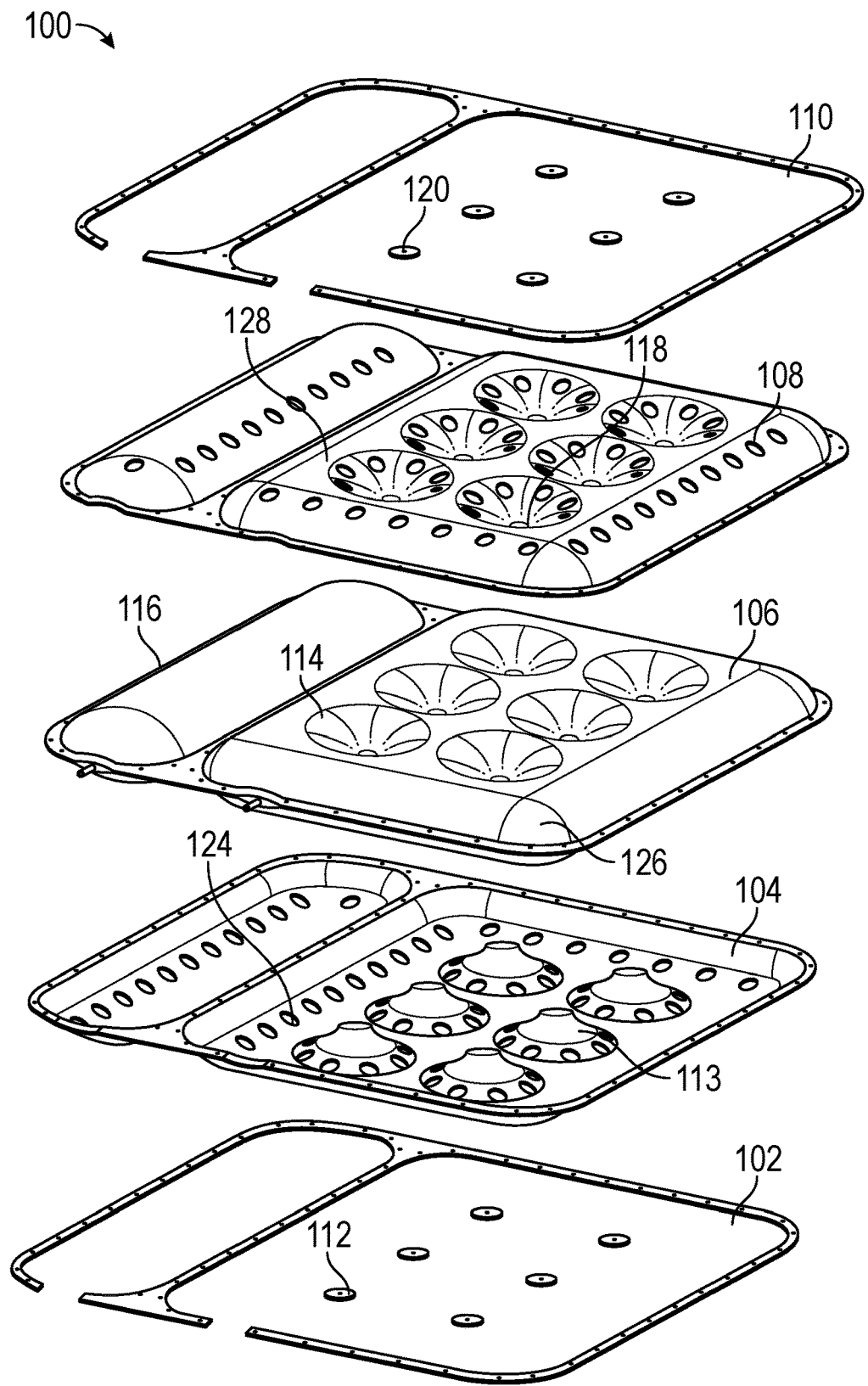
FIG. 1A-B shows an exploded view of an exemplary system for storing fluid.
Figure 1B:
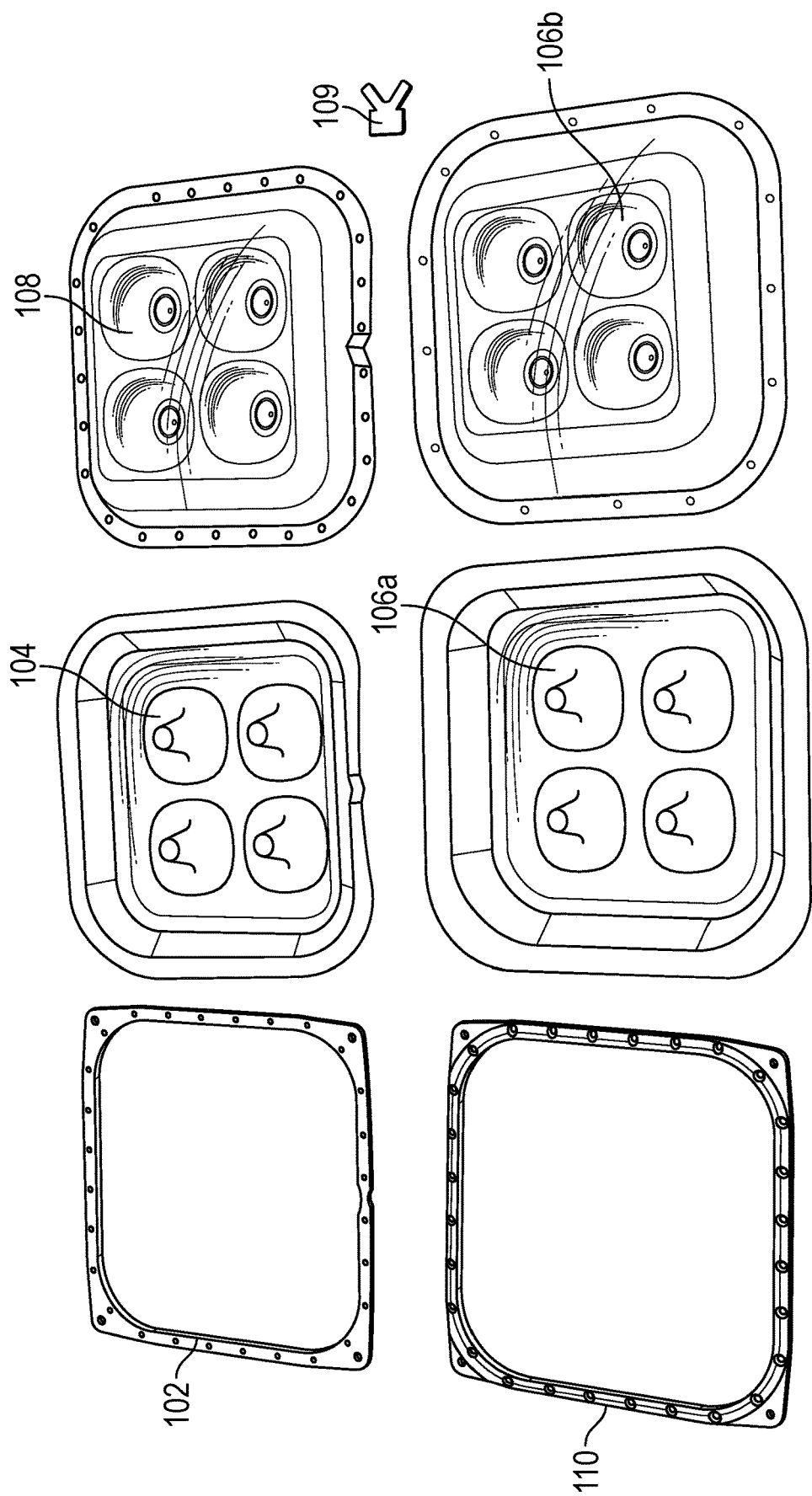

FIG. 1A-B shows exemplary components comprising a system for storing fluid. In some embodiments, the stored fluid may be a liquid. For example, the stored fluid may be water. In other embodiments, the stored fluid may be a gas. For example, the stored fluid may be oxygen.

FIG. 1A shows an exploded view of components that may comprise the fluid storage system. The system may include a first shell component 104 and a second shell component 108. In some embodiments, the first shell component 104 and the second shell component 108 may be rigid. For example, the two shell components 104 and 108 may be so configured that they possess a high strength-to-weight ratio, and may have a high mechanical toughness that may be able to resist crush and puncture loads. In some embodiments the first and second shell components 104, 108 may have symmetrical geometries.

The system may also include a first container 106. The first container 106 may be configured so that it is able to store fluid. The first container 106 may be configured so that its internal volume may vary as fluid enters or leaves the first container 106. In some embodiments, the first container 106 may expand, (e.g., increasing the internal volume) as fluid enters the first container 106, and may contract (e.g., decreasing the internal volume) as fluid exits the first container 106.

The first container 106 may have a symmetric three dimensional geometry. The geometry of the first container 106 may configured such that the container is smooth and wrinkle free both when it is fully contracted (i.e. empty) and fully expanded (i.e. full). For example, as shown in FIG. 1A, the first container 106 may have an air-mattress geometry with regularly spaced depressions 114. As used herein, the term air-mattress refers to a smooth three-dimensional volume with opposing sides connected by one or more interior depressions. The air-mattress geometry may allow for high internal pressure resistance. In addition, the air-mattress geometry may allow the system to approximate a rectangular prismatic geometry, which is desirable for use in applications with limited space.

In some embodiments, the fluid storage system 100 may include a second container 116. The second container 116 may be configured to store fluid. The second container 116 may be configured so that its volume may vary as fluid enters or leaves the second container 116. In some embodiments, the second container 116 may expand, (e.g., increasing the internal volume), as fluid enters the second container 116, and may contract (e.g., decreasing the internal volume) as fluid exits the second container 116.

In some embodiments, the second container 116 may have a substantially cylindrical geometry. In other embodiments, the second container 116 may have an air mattress geometry similar to the first container 106.

The container 106 may be disposed in between the first shell component 104 and the second shell component 108. The first container 106 may be disposed such that the first shell component 104 limits the first container 106 from expanding in a first direction (e.g., downward in the orientation shown in FIG. 1A). In some embodiments, the container 106 may be so disposed so that the second shell component 108 limits the expansion of the container 106 in a second direction (e.g., upward in the orientation shown in FIG. 1A).

In some embodiments, the second shell component 108 may be attached to the first shell component 104 via clamps 102, 110. A first surface portion of the container 106 (e.g., the upper surface in the orientation shown in FIG. 1A) may be flexible and free to move between the shell components 104 and 108. A second surface portion of the container 106 (e.g., the lower surface in the orientation shown in FIG. 1A) may be affixed to the first shell component 104. In an empty state, the first surface portion may lie along the first shell component 104. As the container 106 is filled with fluid, the first surface portion of the container 106 may move away from the affixed second surface portion until it contacts the second shell component 108. Thus, the portion of the container 106 attached to the first shell component may be fixed, while the other portion of the container 106 may be free to move in between the first and second shell components 104, 108. Preferably, the surfaces of the container may have a nominal geometry that corresponds to the geometry of the two shell components. For example, the surfaces may be configured to lie smoothly along the shell components without wrinkling or otherwise being stressed or strained. The unfixed surface may be configured to lie smoothly along the first shell component 104 without stress when the container is in an empty state, and as the container 106 is filled, the geometry of the unfixed surface may be inverted such that it lies smoothly along the second shell component 108 without stress.

In some embodiments, the container 106 may instead be defined by a combination of (i) a single flexible membrane and (ii) the first shell component. For example, the first shell component 104, which may optionally be provided as a closed surface without holes or vents, may act as one surface portion of the container 106, and a membrane (e.g., surface portion 106A in FIG. 1B) may act as the other surface portion of the container 106. In such embodiments, the fixed surface portion may be omitted, and the shell component 104 may directly contact the fluid stored in the container. Optionally, the shell component 104 may be provided with a high-purity, chemically stable coating to mitigate against contamination of the fluid stored in the container.

In some embodiments, the first and second shell components 104, 108 may be configured such that when the first container 106 is in a full state (i.e. fully expanded), at least 50%, at least 60, at least 70%, at least 80, at least 90%, or at least 95% of the surface area of the container lies on at least one cross-section that is substantially circular, catenary, or elliptical. For example, in FIG. 1A, the first shell component 104 is shown having a substantially semi-circular cross section 124, and the second shell component 108 is shown having a substantially semi-circular cross-section 128. When the two shell components are coupled to one another, they may form a substantially circular cross-section. In other embodiments or for other cross-sections, the geometry may be substantially catenary or substantially elliptical. By forming the container and shell components such that the surface area of the container predominantly lies in circular, catenary, or elliptical cross-sections, the ability of the container to carry an internal pressure load may be substantially improved. This, in turn, may allow the container to be made from ultra-pure materials that have lower material strength without risking failure under a wide range of operating conditions.

In some embodiments, the shell components 104, 108 may have ridges 113, 118, which may correspond to the air mattress geometry of the container 106.

In some embodiments, the second container 116 may also be disposed between the first shell component 104 and the second shell component 108. The first shell component 104 may limit an expansion of the second container 116 in a first direction, and the second shell component 108 may limit an expansion of the second container 116 in a second direction.

In some embodiments, the first container 106 may be attached to the first shell 104. In further embodiments, the second container 116 may also be attached to the first shell component 104.

In some embodiments, the system may include a first clamp 102 and a second clamp 110. The first clamp 102 and the second clamp 110 may be used to clamp the first shell component 104 to the second shell component 108. The first clamp 102 may be attached to the outside of the first shell component 104, and the second clamp 110 may be attached to the outside of the second shell component 108. The two clamps 102, 110 may be attached to one-another to fasten the first shell component 104 to the second shell component 108. A variety of materials, geometric designs, fasteners, and spacings between fasteners may be used to ensure that flexure in the clamps between fasteners is small enough to prevent stress in the shell and container components. Preferably, the clamps may be made from materials with high stiffness, toughness, and ultimate tensile strength. In some embodiments, the clamps 102, 110 may include holes or other structures which may be used to mount the system 100 to a desired structure (e.g., a portion of a vehicle, spacesuit, or station). The system may also include a plurality of bolts, rivets, or other fasteners, which may preferably fasten the shell components to one-another at their perimeter and at one or more of the ridges 113, 118. The fasteners may have sufficient tensile strength to support a pre-load tension equal to the maximal internal pressure load.

In other embodiments, the first shell component 104 and the second shell component 108 may be joined without clamps, 102, 110. The two shell components 104, 108 may joined without clamps when significant internal pressure is not anticipated. For example, the two shells may be joined by adhesive or by fasteners placed directly through the two shell components 104, 108.

FIG. 1B shows exemplary components of the fluid storage system 100. In some embodiments, the first container 106 may comprise two surface portions 106A, 106B. In some embodiments, the surface portions 106A, 106B may be made from thermoplastic polymers such that they may be thermally welded to one another to form container 106. In some embodiments, the surface portions 106A, 106B may be made from any flexible material that can be suitably formed to the required geometry, sealed to itself and is chemically compatible with the operating fluid. For example, the container may be made from ultra-pure, chemically stable materials. In some embodiments, the container may be made from fluoropolymers such as fluorinated ethylene propylene, perfluoroalkoxy alkane, and ethylene tetrafluoroethylene. Other candidate materials include polymers, plastics, elastomers, rubbers, metal foils, composites, or multi-layer laminates. The use of ultra-pure, chemically stable materials may advantageously prevent contamination or degradation of the fluid stored in the container, which may be of particular importance for spaceflight, as fluids may need to be stored in the container over significant periods of time. The container may also be provided with functional coatings that could include polymers, ceramics, metals, gels, etc. In some embodiments, the surface portions 106A and 106B may be transparent.

In some embodiments, the first shell component 104 and the second shell component 108 may not be exposed to fluid in either container 106 or container 116. The first shell component 104 and the second shell component 108 may be made out of a material that does not have exceptional purity and chemical stability and may made from any engineering material that can be formed to the required geometry, have higher resistance to deformation than the container material, and have sufficient strength to resist the maximum internal pressure load. In some embodiments, the material the comprising the first shell component 104 and the second shell component 108 may be transparent.

FIG. 1B also shows clamps 102 and 110. The clamps may be machined from solid billet. In some embodiments, the clamps 102 and 110 may be made by casting or injection molding when the corresponding material selections permit.

FIG. 1B also shows a feedthrough port 109. One or multiple ports may be provided to communicate with the internal volume of each container, and one or multiple ports may be provided to communicate with the corresponding space.

Figure 2:
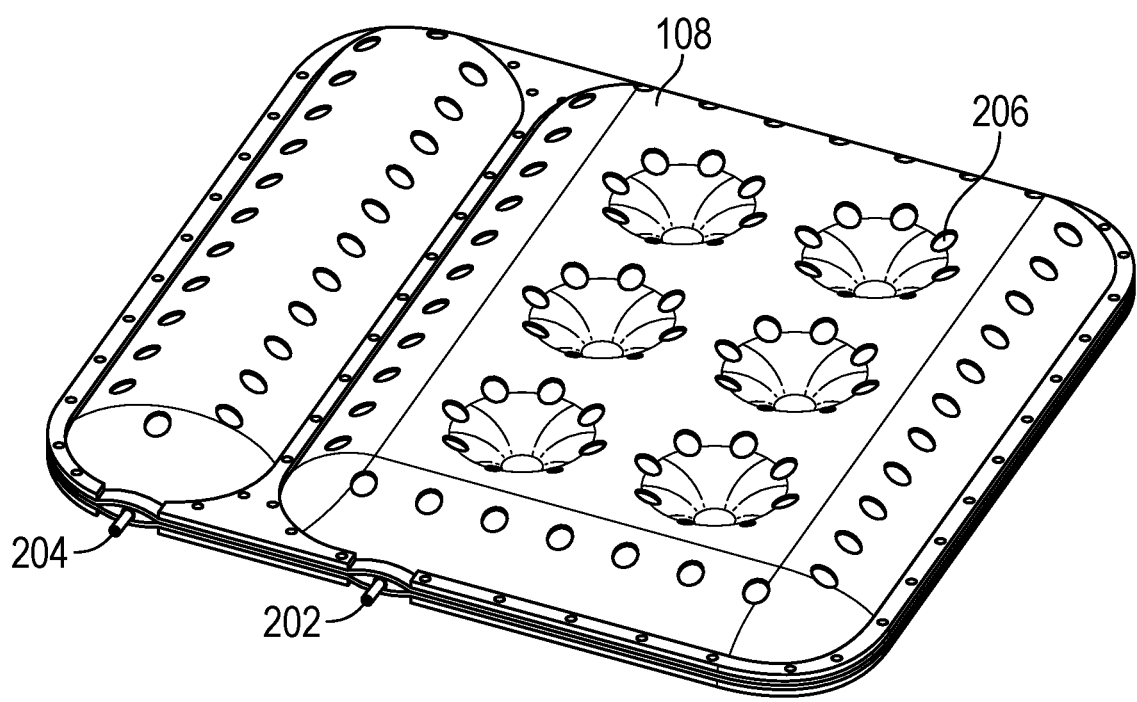
FIG. 2 shows exemplary components of a system for storing fluid.

FIG. 2 shows an exemplary fluid storage system in an assembled state. The first container 106 may be disposed in between the first shell component 104 and second shell component 108. In further embodiments, the second container 116 may also be disposed in between the first shell component 104 and second shell component 108. The first container 106 may have a port 202. The second container 116 may have a port 204. The containers may be filled and/or emptied through their respective ports. The ports 202, 204 may be made from any engineering material that can be sealed to the first container 106 and/or second container 116 and is chemically compatible with the fluid being stored in the containers 106, 116. In some embodiments, the ports 202, 204 may be made from a material that can be injection molded for precise and economical fabrication.

In some embodiments, at least the second shell component 108 may have vents 206. The vents 206 may allow fluid (e.g., gas) to flow into and out of the space between the second shell component 108 and the container 106. Vents 206 may advantageously allow for contents of the first and second containers 106, 116 to remain at pressure equilibrium with a surrounding environment. In some embodiments, the first shell component 104 may also have vents.

In another embodiment, the vents 206 may be omitted, forming one or more sealed spaces between the second shell component 108 and the first container 106 and/or second container 116. One or more ports may be provided that communicate with the one or more sealed spaces between the second shell component 108 and the containers 106, 116. These ports may optionally be connected to a pressure source (which may be configured to apply positive or negative pressure), which may allow the containers to be filled or emptied under pressure. In some embodiments, the pressure source may be a pump or vacuum.

In another embodiment, fluid may be transferred from a container to its corresponding sealed space by a pump during use. This fluid transfer may be deployed when the fluid is used as a consumable reagent, catalyst, or absorber that needs to be stored as waste after use. For example, clean fluid may be stored in the first container 106, pumped through a process system, and then returned to the sealed space between container 106 and the second shell 108 after use to be stored for disposal or recycling at a later time. This arrangement may save space and weight by eliminating the need for a second collection vessel. This arrangement is expedient since the volume of the sealed space may increase at the same rate that the volume container decreases while fluid is moved from one to the other, leaving no ullage during the process.

Figure 3:
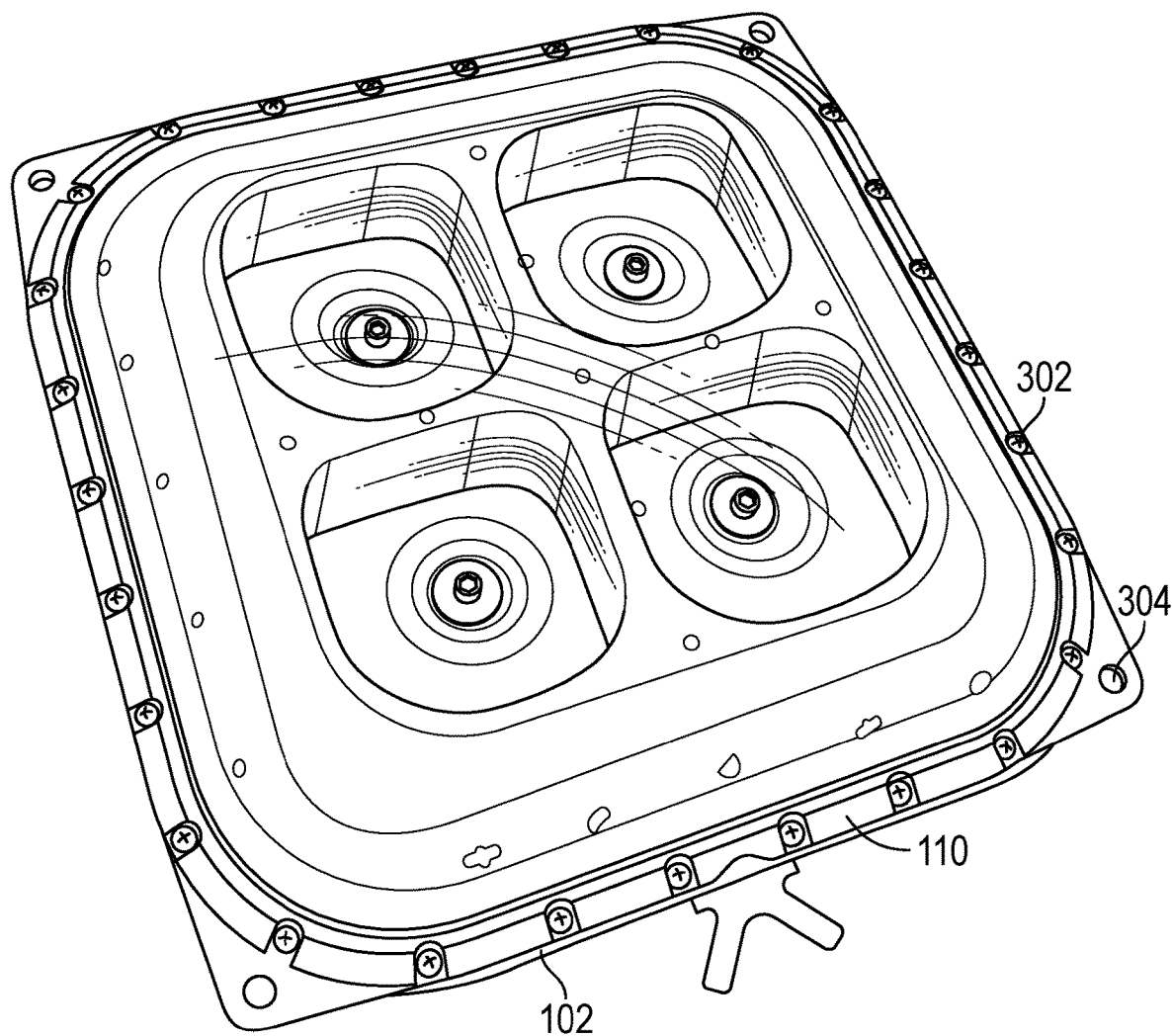
FIG. 3 shows an exemplary container for storing fluid.

FIG. 3 shows an embodiment of a fluid storage system. The system may include a plurality of fasteners 302. The fasteners 302 may be used to fasten the clamps 102, 110 to each other through holes provided in the shell components 104, 108. The fasteners 302 may have sufficient tensile strength to support a pre-load tension equal to the maximal internal pressure load. In some embodiments, the clamps 102, 110 may have one more mounting points 304 for convenient assembly. The clamps 102, 120 may be made out of an engineering material with high stiffness and toughness as well as sufficient ultimate tensile strength for the application.

In some embodiments, the system may include an electrical circuit that is configured to measure the internal volume of the first container 106 and/or the second container 116. Exemplary systems that may be used to measure the internal volume of the containers 106, 116 are described below with reference to FIGS. 4-6.

Figure 4:
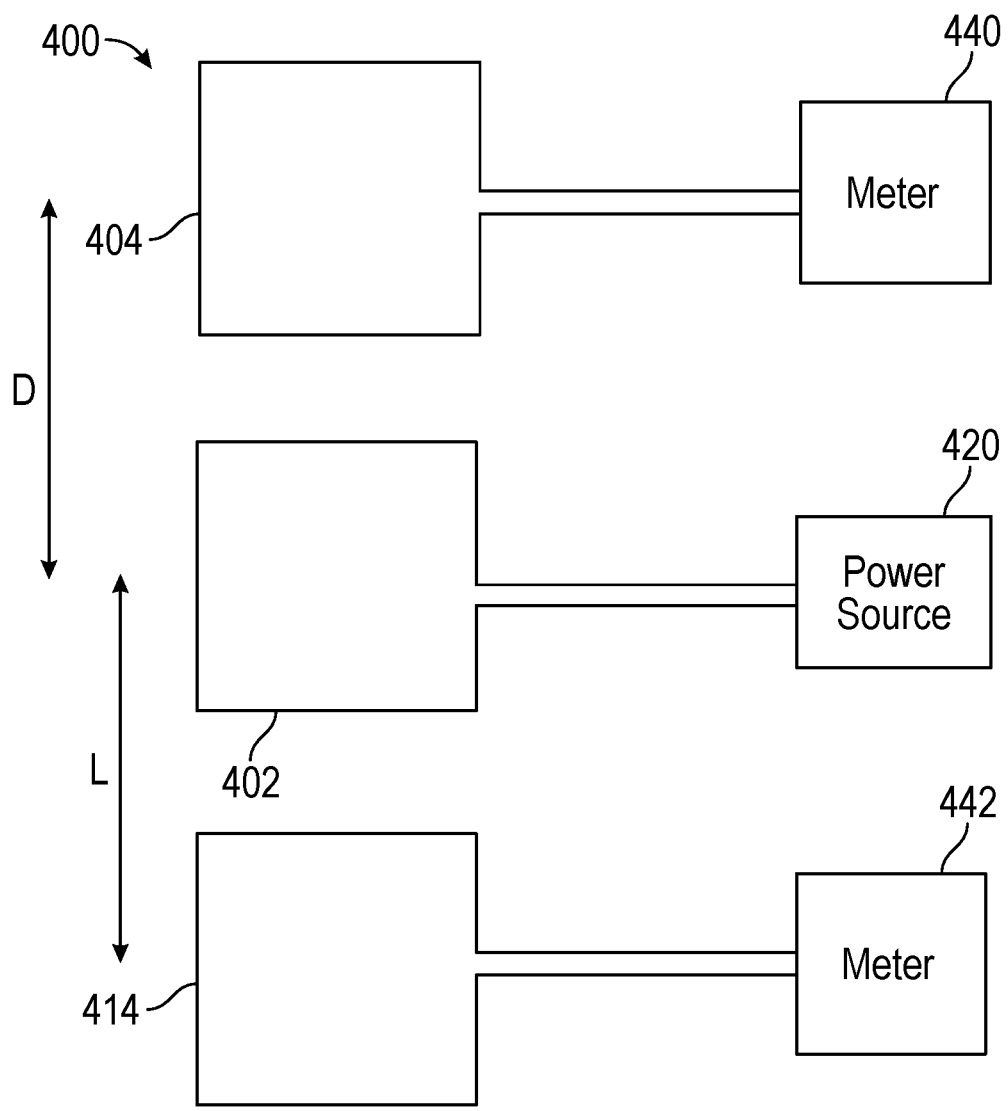
FIG. 4 shows an exemplary system for sensing volume.

FIG. 4 shows an exemplary system 400 for sensing volume. In some embodiments, the system may sense the volume of a container. FIG. 4 shows an exemplary diagram for sensing volume with two loops. A first loop 402 may be configured to carry an excitation current. A second loop 404 may be arranged to receive an induced current in response to a changing magnetic field generated by the excitation current in the first loop 402. The second loop 404 may be connected to a meter 440, which may be configured to measure the induced current in the second loop 404. For example, the meter 440 may be configured to measure voltage, amperage, or other parameters related to the current induced in the second loop 404.

The first loop 402 may be connected to a power source 420, which may be used to generate the excitation current. The excitation current may optionally be an alternating current or a direct current. In some embodiments, the excitation current may be an alternating current of a fixed frequency.

The sensor system 400 may be used to measure the volume of an expansible container. In some embodiments, excitation loop 402 may be attached to a surface on one side of a container, and the measurement loop 404 may be attached to a second surface that moves relative to the excitation loop in response to changes in volume in the container. Distance D may represent a distance between the excitation loop 402 and the measurement loop 404. The magnitude of the second current induced by the magnetic field may increase as distance D becomes shorter and may decrease as distance D becomes greater. Because distance D increases and decreases as the container is filled and emptied, the magnitude of the induced current may indicate the volume of fluid in the container.

In some embodiments, a relationship between the magnitude of induced current in the measurement loop 404 and the volume of fluid in a container may be experimentally calibrated. This calibration may be performed by filling and draining the container to a series of known volumes while recording the measurement of the induced current, and then generating a calibration function once sufficient data has been collected. In some embodiments, a polynomial of order 3 or greater may be used to model this relationship. In some embodiments, the polynomial may be between order 3 and 6. In some embodiments, the calibration function may achieve absolute accuracy within 15%, 10%, 5%, 3%, 2%, or 1% of the full volume of the container. In some embodiments, separate calibration functions may be generated for filling and draining. Using two separate calibration functions may advantageously improve measurement accuracy for containers in which hysteresis occurs.

In some embodiments system 400 may include a third loop 414. In some embodiments, the third loop 414 may be a reference loop, which may be used to improve measurement accuracy and control for sources of noise. In some embodiments, the reference loop 414 may be attached to a fixed surface that is spaced a fixed distance L relative to the excitation loop 402. A meter 442 may be used to measure the current induced in the reference loop 414. In other embodiments, system 400 may include a fourth loop, which may be a second reference loop that performs a function similar to the first reference loop 414 but at a different fixed distance L.

In some embodiments, either the first reference loop or the second reference loop (or both) may be used to compensate for outside noise or interference. For example, nearby metal structures, magnets, and/or incident electro-magnetic radiation can modify the magnetic field induced by the excitation loop and thus perturb the electrical potential induced in the measurement loop. The optional reference loops may be used to passively correct for these effects. External sources of noise will generally have substantially (e.g., +/−5%) equal effect on both the measurement loop 404 and reference loop 414. Thus, rather than correlating bladder volume directly to the potential induced in the measurement loop, one may instead correlate it to the ratio of the potentials induced in the measurement and reference loops. Calculating such ratios may advantageously cancel out external perturbations that affect two loops equally, and may instead measure only the difference between the measurement and reference loops that results from their differing physical positions relative to the excitation loop. This passive compensation may also correct for uncertainty in the electrical current amplitude driven in the excitation loop.

The loops 402, 404, 414 may be constructed out of insulated wire. In some embodiments, the material selected for the excitation loop 402 may be configured to handle the required current without the temperature of the material rising. Because the currents in the measurement and reference loops 404, 414 will generally be low, these loops may be formed using smaller gauge wire than is used for the excitation loop 402. For example, stainless steel yarn may be used for one or all of the loops. In some embodiments, the measurement and reference loops 404, 414 may be formed from conductive polymer tape, paint, or carbon fiber. In some embodiments, one or more of the loops 402, 404, 414 may be coupled to a common bus, chip, or circuit.

Loops 402, 404, 414 may take a variety shapes. In some embodiments, the geometry of the loops 402, 404, and 414 may be symmetrical in both shape and size. In some embodiments, the geometry of the measurement loop 404 may comprise a simple design such as a circular, square, or rectangular shape. Preferably, the measurement loop 404 may be positioned such that it runs along the portions of a container that are most displaced relative to the excitation loop when the container is filled and emptied. It is also preferable that the measurement loop 404 be arranged such that it collects a representative sample of the expansion of the entire container. For example, the magnitude of the induced current in the measurement loop 404 should preferably indicate an average thickness of the fluid between a first side of the container and a second side of the container. In some embodiments, the measurement loop may be disposed about a side of the container such that at least 30%, 40%, 50%, 60%, 70%, 80%, or 90% of an area of a side of the container is located within an internal area of the measurement loop. By arranging the measurement loop such that a significant portion of the area of container lies within the loop, and along the surfaces that displace the most as the internal volume changes, a representative sample of the thickness of the fluid within the container may be obtained.

Figure 5:
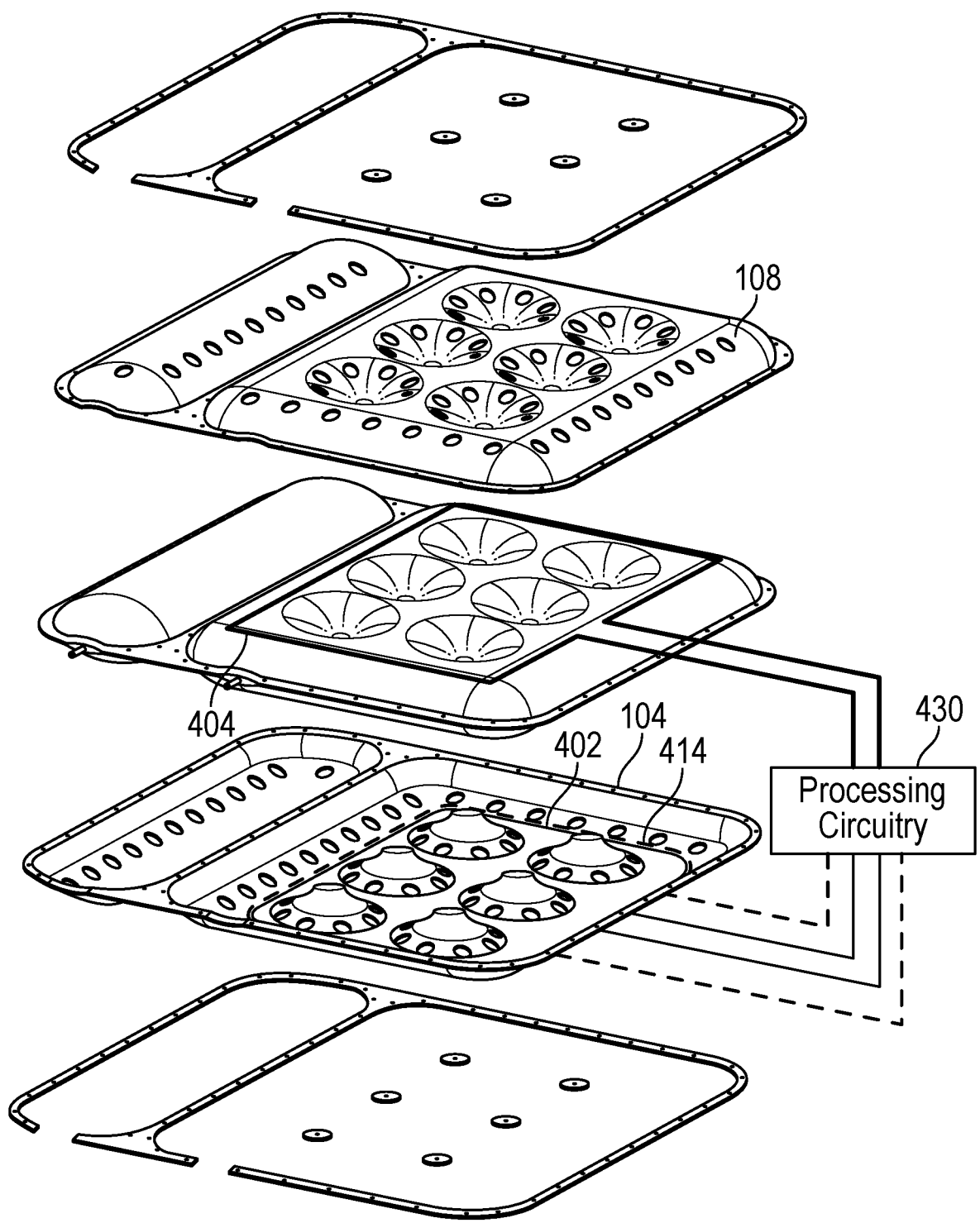
FIG. 5 shows an exemplary embodiment of a volume sensor.

FIG. 5 shows an exemplary embodiment of the volume sensor. In some embodiments, the excitation loop 402 and reference loop 414 may be attached to first shell component 104. In other embodiments, the excitation loop 402 may be attached to the first shell component 104 and the reference loop 414 may be attached to the second shell component 108. In other embodiments, the excitation loop 402 and reference loop 414 may be attached to the first shell component 104 and a second reference loop may be attached to the second shell component 108. The excitation loop 402 and the reference loops may be attached to the shell components via lamination. In some embodiments, the excitation loop 402 and reference loop 414 may be attached to an outer portion of the first shell component 104 (e.g., the side of first shell component 104 facing away from the first container 106). In other embodiments, the excitation loop 402 and reference loop 414 may be attached to the inner portion of the first shell component 104 (e.g., the side of the first shell component that is facing towards the first container 106). The reference loop 414 may be nominally coincident with the excitation loop 402, i.e. with dimension L equal to zero.

In some embodiments, the measurement loop 404 may be attached to container 106. Although the measurement system is arranged in FIG. 5 to measure volume in first container 106, the same or a similar measurement system may be used to additionally or alternatively measure volume in additional containers, such as second container 116. For example, two measurement systems as described herein may be used, respectively, to measure volume in both the first container 106 and second containers 116. In some embodiments, the measurement loop 404 may be attached to the first container 106 via lamination. In some embodiments, the measurement loop 404 may be connected to the portions of the container 106 that move most relative to the first shell component 104 when the container is filled and emptied.

In some embodiments, the loops 402, 404, 414 may be substantially coaxial, such that a center of each of the loops lies along a common axis that is substantially perpendicular to the planes of the loops. In some embodiments, the loops may remain substantially coaxial as the container is filled and emptied. In some embodiments, the loops may be disposed in planes that are substantially parallel to one another. In some embodiments, the loops may remain in substantially parallel planes as the container is filled and emptied. For example, although the plane of the measurement loop 404 rises and falls as the container is filled and emptied, the plane may retain its parallel orientation to the plane of the excitation loop 402 and/or reference loop 414.

Loops, 402, 404, 414 may be connected to processing circuitry 430. Processing circuitry 430 may be configured to apply an excitation current and measure induced currents on one or both of measurement loop 404 and optional reference loop 414. In some embodiments, the processing circuitry 430 may include the power source and meters shown in FIG. 4.

In some embodiments, the measurement loop 404 may be connected to the second container 116 so that it may rise with the second container 116 as it expands, and lower with the second container 116 as it contracts. The measurement loop 404 may be coaxial with the excitation loop 402 and/or reference loop 414.

Figure 6:
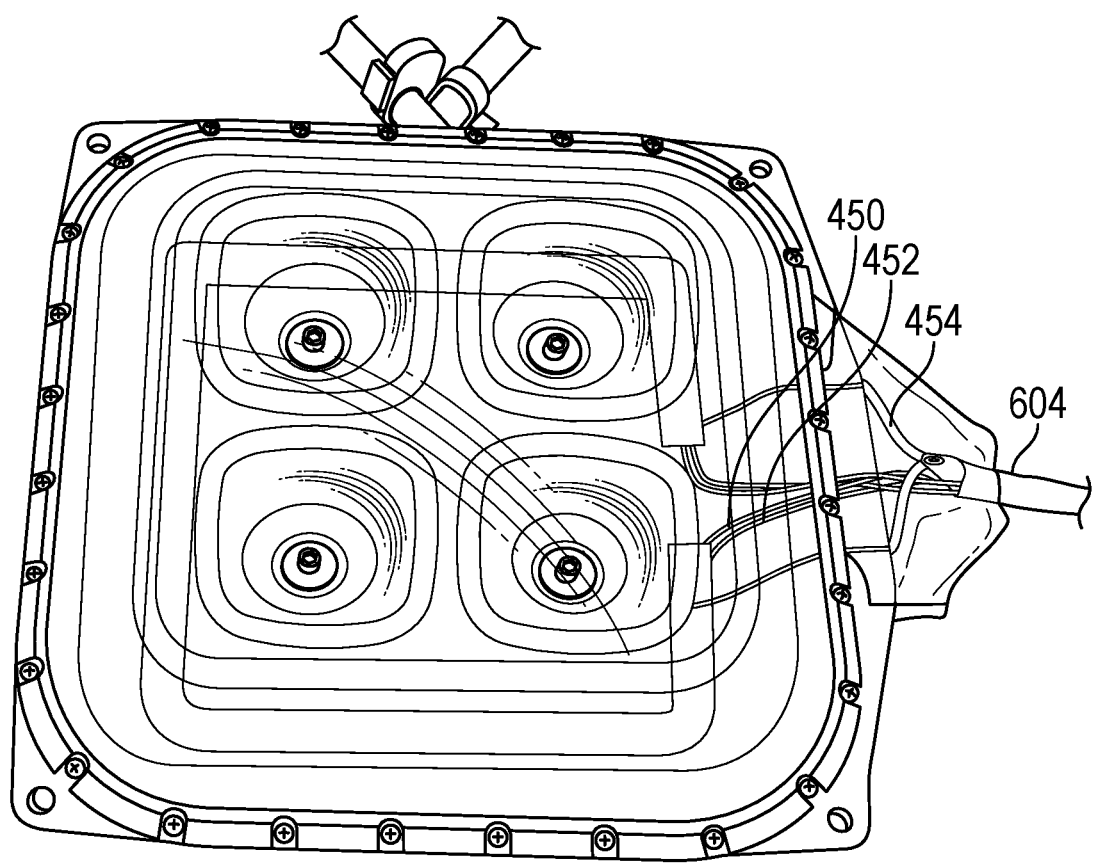
FIG. 6 shows an exemplary volume sensor attached to a fluid storage system.

FIG. 6 shows an exemplary attachment of a volume sensor as described in FIGS. 4 and 5 to a fluid storage container. In some embodiments, the wires 450, 452, 454 may connect the loops to the processing circuitry via a cable 604. In some embodiments, wires 450, 452, 454 may be twisted within cable 604 to prevent inductive coupling.

Although the volume sensor is shown in FIGS. 5 and 6 as being used to measure volume in the fluid storage system of FIGS. 1-3, it should be understood that other embodiments of this sensor could be integrated with other bladders or rigid piston-style fluid reservoirs.

Figure 7A:
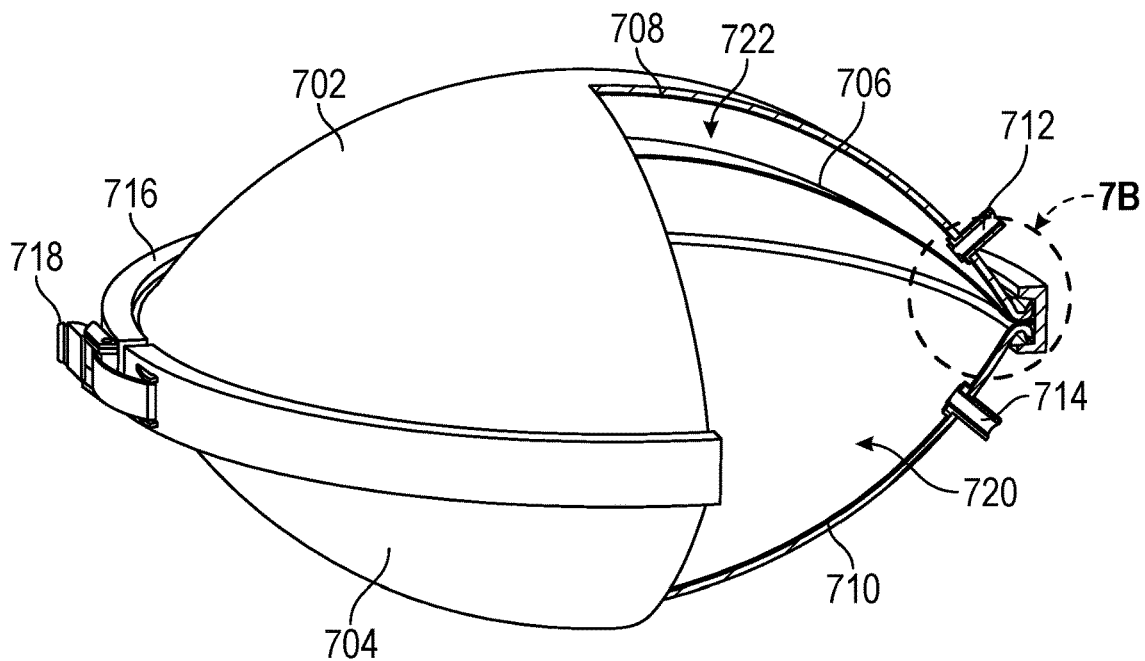
FIGS. 7A and 7B show another exemplary embodiment of a fluid storage system.
Figure 7B:
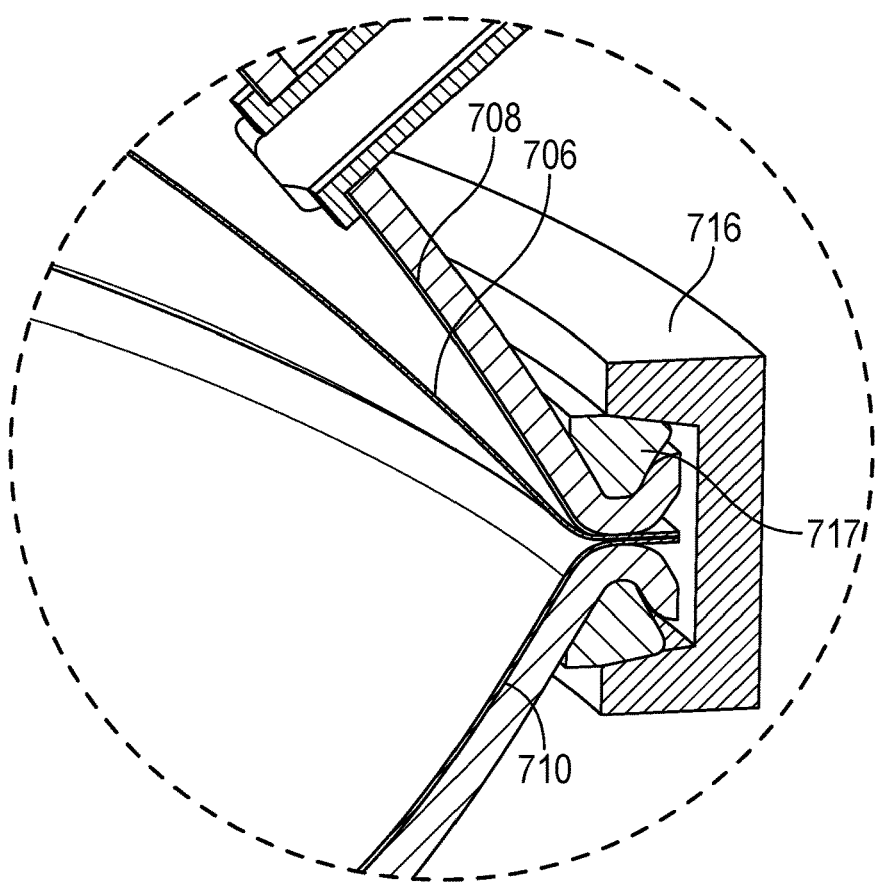

FIGS. 7A and 7B show another example of a fluid storage device. FIG. 7B shows an enlarged view of the portion of FIG. 7A that is designated with reference numeral 7B. Similar to the storage device shown in FIGS. 1-3, the embodiment shown in FIGS. 7A and 7B may include a flexible bladder surrounded by a more rigid shell. The embodiment shown in FIGS. 7A and 7B may be particularly suited to be used as a pressure driven tank for storing fluids as to which it is important to avoid contamination. For example, the device can be used as a pressure driven tank for potable water.

The fluid storage device may include a shell, which may optionally include a first shell component 702 and a second shell component 704. In some embodiments, the first shell component 702 and second shell component 704 may have curved geometries that are symmetrical to one another. The first shell component 702 and second shell component 704 may together form a geometry that is substantially oval or spherical. The shell may surround a flexible bladder, which may be formed of one or more membranes. For example, as shown in FIGS. 7A and 7B, the bladder may include a first membrane 706 which may move as the volume in the bladder changes. The bladder may also include one or both of a second membrane 710, which may be fixed to second shell component 704, and a third membrane 708, which may be fixed to first shell component 702. The first membrane 706 may have a nominally curved geometry that corresponds to the geometries of the first and second shell components, such that the first membrane 706 may lie without stress or deformation against the first shell component and/or the second shell component when the bladder is full or empty.

The bladder may define a first volume 720 and a second volume 722. In some embodiments, both the first volume 720 and the second volume 722 may be hermetically sealed. In some embodiments, the first volume 720 may be filled with a liquid (such as water), and the second volume 722 may be pressurized with a gas. The pressurized gas may provide motive force for dispensing the fluid or for maintaining it at a known pressure. Liquid may flow into or out of the first volume 720 via a port 714, and gas may flow into or out of the second volume 722 via a port 712. Alternatively, the volume holding liquid and the volume holding gas may be reversed, both volumes may hold a liquid, or both volumes may hold a gas.

The bladder membranes can be made of a low-diffusion laminate using materials such as those described above with respect to FIGS. 1-3. Using a low-diffusion laminate may advantageously prevent loss of pressure and fluid by diffusion through the membranes, and may also prevent the liquid from becoming saturated with dissolved gas. The shell may provide mechanical support to allow operation at high pressure. Optionally, membranes 708, 710 may prevent the shell from contacting either the liquid or the gas.

In some embodiments, the shell components 702, 704 may be attached to one-another using a retaining ring 717 and clamp 716 arrangement as shown in FIG. 7B. The shell components may have a ridged lip, as shown in FIG. 7B, sized to receive the retaining rings 717. The clamp may be fastened using a latch 718 as shown in FIG. 718. In some embodiments, the membranes 706, 708, 710 may be heat-sealed to one another around an outer circumference of the bladder, which may, for example, lie between the retaining rings as shown in FIG. 7B.

The geometry of the device may advantageously improve both pressure tolerance and floating-membrane cycle-life. The shell, retaining rings, and clamp can be composed of a structural polymer, composite, or metal. The retaining rings and clamp ring with draw latch may allow tool-free replacement of the bladder assembly should it become damaged or dirty.

Figure 8A:
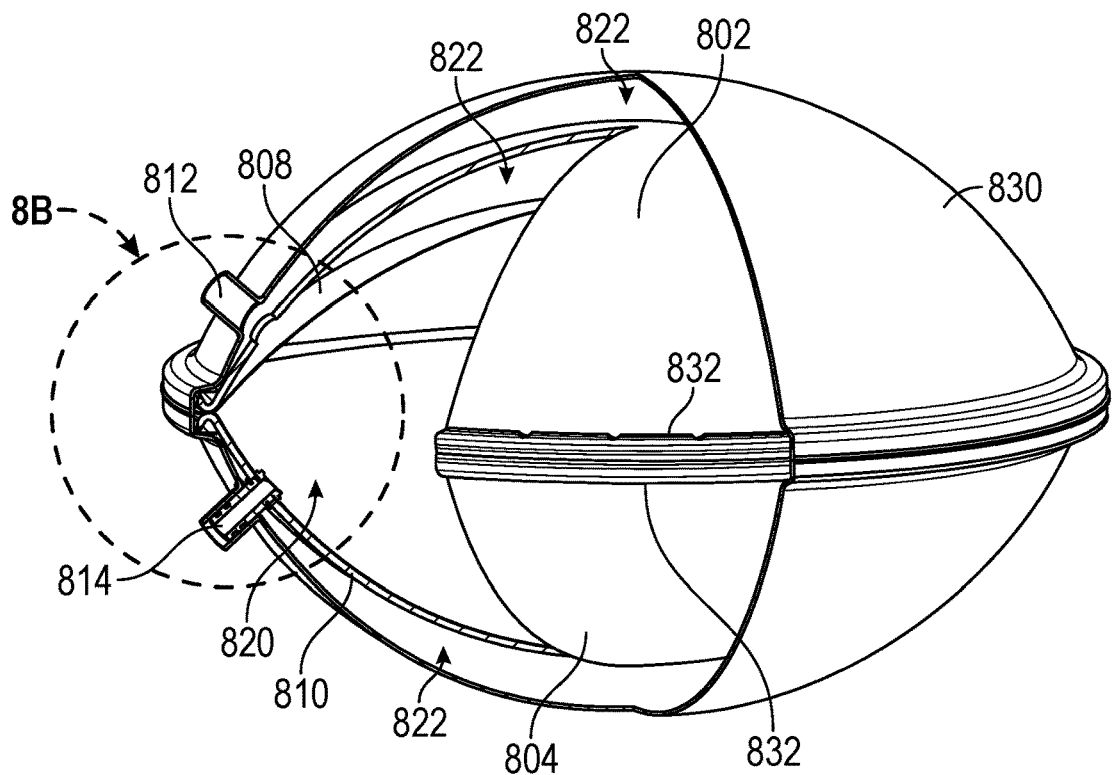
FIGS. 8A and 8B show another exemplary embodiment of a fluid storage system.
Figure 8B:
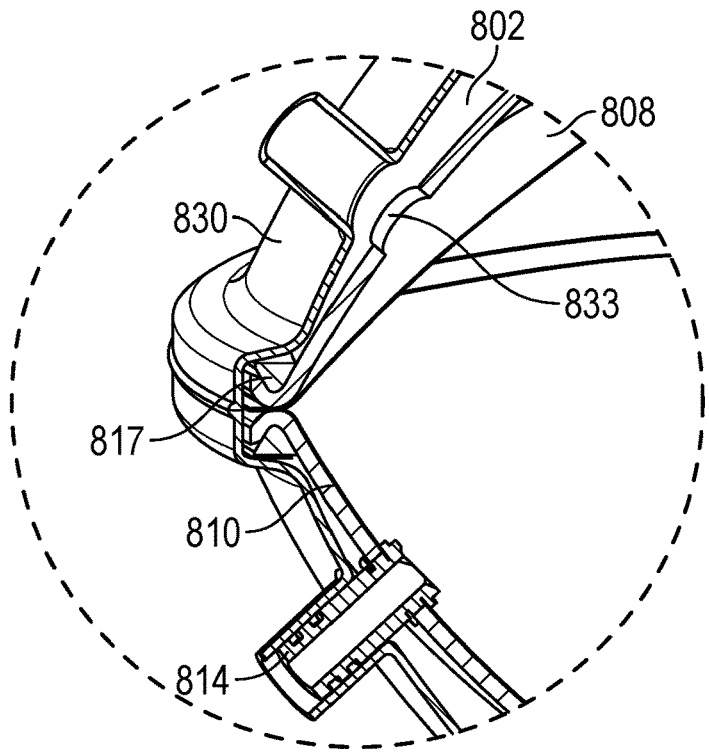

FIGS. 8A and 8B show another exemplary embodiment of a fluid storage device. FIG. 8B shows an enlarged view of the portion of FIG. 8A that is designated with reference numeral 8B. The embodiment shown in FIGS. 8A and 8B may be particularly suited to serve as a fluid pressure accumulator. Accumulators are commonly used in closed-loop process systems to maintain the pressure of a fluid despite changes in volume due to thermal expansion, phase change, etc. The device may include a shell, which may be formed of first and second shell components 802, 804, a bladder, which may be formed of first and second membranes 808, 810, and an outer pressure shell 830, which may serve as a high-pressure reservoir. In some embodiments, the pressure shell 830 may be formed of a stronger material than shell components 802, 804. For example, the shell components 802, 804 may be formed of a polymeric material, while the outer pressure shell 830 may be formed of metal.

Membrane 810 may be fixed to the second shell component 804, and membrane 808 may be free to move as fluid enters or exits the bladder. The bladder may define a first volume 820, which may store a liquid or gas. The outer pressure shell 830 may form a second volume 822, which may preferably store pressurization gas. The second volume may be disposed within the outer pressure shell 830 but outside of the bladder membranes 808, 810. The second volume 822 may include three sub-volumes, as shown in FIG. 8A. Specifically, one sub-volume may lie between the first shell component 802 and the first membrane 808, another sub-volume may lie between the first shell component 802 and the outer pressure shell 830, and a third sub-volume may lie between the second shell component 804 and the outer pressure shell 830. One or both of shell component 802 and shell component 804 may include vents 832, 833, such that the sub-volumes of the second volume 822 may communicate with one-another and collectively define a single volume 822.

Fluid may flow into or out of the first volume 820 via a port 814. A detailed view of an exemplary port 814 is shown in FIG. 8B. For example, port 814 may include a feedthrough which may be disposed in a conduit in the outer pressure shell 830 and may extend through a hole in the second shell component 804. The feedthrough may form a sealed arrangement with the second membrane 810 and second shell component 804. A second port 812 may be used to provide pressurization gas to the second volume 822. The second volume 822 may optionally be coupled to an external pressure source via the pressure port, or it can be filled with a fixed charge of gas and then the pressure port can be permanently sealed. In some embodiments, the fixed charge of gas may remain within the outer shell 830 for the full lifetime of the device. In some embodiments, the bladder membranes can be made of the low-diffusion laminate described above. Preferably, no significant diffusive loss occurs through the outer metal shell. In some embodiments, the inner shell may provide mechanical support to the bladder in the case that the bladder experiences pressure greater than that of the accumulator gas, supplied by an external source through the fluid port 814.

Similar to the embodiment described above with respect to FIGS. 7A-7B, the shell components 802, 804 may have curved geometries that are symmetrical to one another. The first shell component 802 and second shell component 804 may together form a geometry that is substantially oval or spherical. The first membrane 808 may have a nominally curved geometry that corresponds to the geometries of the first and second shell components, such that the first membrane 808 may lie without stress or deformation against the first shell component and/or the second shell component when the bladder is full or empty.

In some embodiments, the shell components 802, 804 may be attached to one-another using a retaining ring 817 arrangement as shown in FIG. 8B. The shell components may have a ridged lip, as shown in FIG. 8B, sized to receive the retaining rings 817. The outer pressure shell 830 may act as a clamp to hold the retaining ring in place within the ridged lip. In some embodiments, the membranes 808, 810 may be heat-sealed to one another around an outer circumference of the bladder, which may, for example, lie between the retaining rings as shown in FIG. 8B.

The curved geometry of the shell may advantageously maximize both pressure tolerance and floating-membrane cycle-life. An additional benefit of this accumulator configuration is that volume sensor loops (e.g., as described above with respect to FIGS. 4-6) applied to the rigid shell may be protected mechanically and shielded electrically by the outer metal shell.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A system for storing fluid, the system comprising:
 a container, the container having an internal volume that is configured to change as fluid enters or exits the container;
 a first shell component;
 a second shell component, the internal volume of the container being disposed between the first shell component and the second shell component such that the first shell component limits an expansion of the container in a first direction, and the second shell component limits the expansion of the container in a second direction that is opposite the first direction;
 wherein a first space is defined between the second shell component and a first surface portion of the container, the first space having a volume that decreases as fluid enters the container and the internal volume of the container increases;
 an outer pressure shell that fully encapsulates the container, the first shell component, and the second shell component;
 wherein a second space is defined, the second space having at least a first sub-volume between the outer pressure shell and the first shell component and a second sub-volume between the outer pressure shell and the second shell component;
 wherein the second space is configured to hold a pressurized gas; and
 wherein at least one of the first shell component and the second shell component comprise one or more vents such that the first sub-volume and the second sub-volume are in fluid communication with each other.

2. The system of claim 1, wherein the first shell component and the second shell component have symmetrical geometries.

3. The system of claim 1, wherein the first shell and the second shell are shaped such that when the container is in a full state, at least 90% of the surface area of the container lies on at least one cross-section that is substantially circular, catenary, or elliptical to efficiently carry internal pressure load.

4. The system of claim 1, wherein the first shell and the second shell together define an air mattress geometry.

5. The system of claim 1, wherein the system further comprises;
 a second container, the second container having a second internal volume that is disposed between the first shell component and the second shell component such that the first shell component limits an expansion of the second container in the first direction, and the second shell component limits the expansion of the second container in the second direction that is opposite the first direction.

6. The system of claim 1, wherein the second shell component has one or more openings such that the space between the container and the second shell component is vented.

7. The system of claim 1, wherein the space between the container and the second shell is coupled to a pressure source, such that the container may be filled and/or discharged under pressure using the pressure source.

8. The system of claim 1, wherein a sealed space between the container and the second shell serves as a secondary fluid storage volume that increases as the internal volume of the container decreases, the secondary fluid storage volume being configured to store used fluid previously stored in the container.

9. The system of claim 1, wherein the container comprises a material selected from a group consisting of fluorinated ethylene propylene, perfluoroalkoxy alkane, ethylene tetrafluoroethylene, polyethylene, ultra-high molecular weight polyethylene, polyamide, and ethylene vinyl alcohol, or a laminate comprising layers composed of one or more these materials.

10. The system of claim 1, wherein the first and second shell components have a higher resistance to deformation than at least the first surface portion of the container.

11. The system of claim 1, wherein a second surface portion of the container is affixed to the first shell component.

12. The system of claim 1, wherein the first shell component defines a wall of the container and is directly exposed to the internal volume of the space.

13. The system of claim 1, wherein the first surface portion of the container has a nominal geometry that corresponds to a geometry of the first shell component, the first surface portion being configured to be inverted when the container is filled such that the nominal geometry of the first surface portion corresponds to a geometry of the second shell component.

14. The system of claim 1, wherein one or more ports communicate with the internal volume of the container and/or the volume of the first space.

15. A method for storing fluid, the method comprising:
 filling with fluid a container having an internal volume that changes as fluid enters the container;
 wherein the container is disposed between a first shell component and a second shell component, the internal volume of the container being disposed between the first shell component such that the first shell component limits an expansion of the container in a first direction, and the second shell component limits the expansion of the container in a direction that is opposite the first direction;
 wherein a first space is defined between the second shell component and a first surface portion of the container, the first space having a volume that decreases as the fluid enters the container and the internal volume of the container increases;
 wherein the container, first shell component, and second shell component are fully disposed within an outer pressure shell;
 wherein a second space is defined, the second space having at least a first sub-volume between the outer pressure shell and the first shell component and a second sub-volume between the outer pressure shell and the second shell component;
 wherein the second space is configured to hold a pressurized gas; and
 wherein at least one of the first shell component and the second shell component comprise one or more vents such that the first sub-volume and the second sub-volume are in fluid communication with each other.

16. The method of claim 15, wherein the first shell and the second shell together define an air mattress geometry.

17. The method of claim 15, the method further comprising:
 filling with the fluid a second container, the second container having a second internal volume that is disposed between the first shell component and the second shell component such that the first shell component limits an expansion of the second container in the first direction, and the second shell component limits the expansion of the second container in the second direction that is opposite the first direction.

18. The method of claim 15, further comprising applying positive or negative pressure to the first space using a pressure source, thereby filling and/or discharging the container under pressure using the pressure source.

19. The method of claim 15, wherein the first surface portion of the container has a nominal geometry that corresponds to a geometry of the first shell component, the first surface portion inverting when the container is filled such that the nominal geometry of the first surface portion corresponds to a geometry of the second shell component.

20. The method of claim 15, wherein the step of filling the container with fluid is performed through one or more ports that communicate with the internal volume of the container and/or the volume of the first space.

\* \* \* \* \*